Jan. 13, 1970  ÄKE SALLOW  3,489,293
MEANS FOR CONTROLLING THE LUFFING AND SWINGING OF A LOAD ARM
Filed Sept. 21, 1967  4 Sheets-Sheet 1
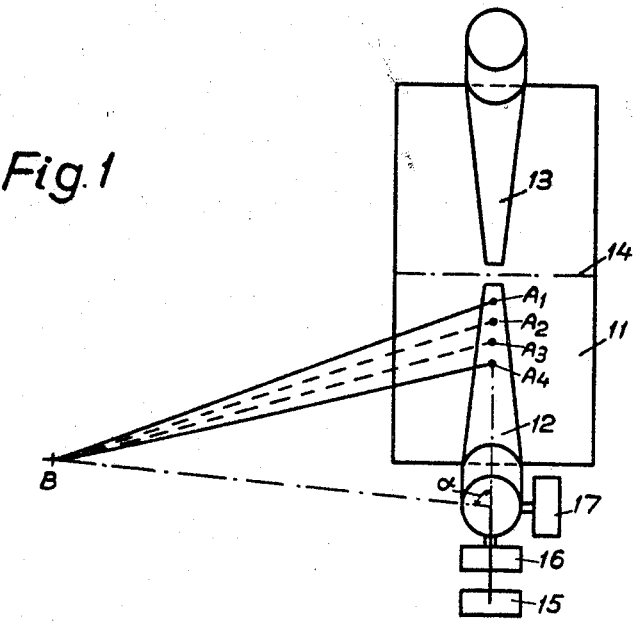
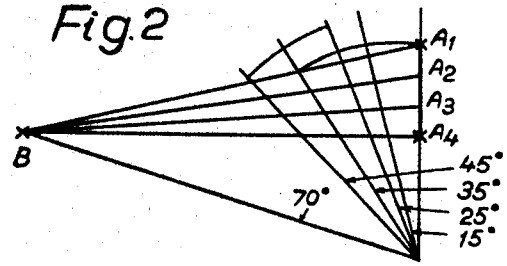
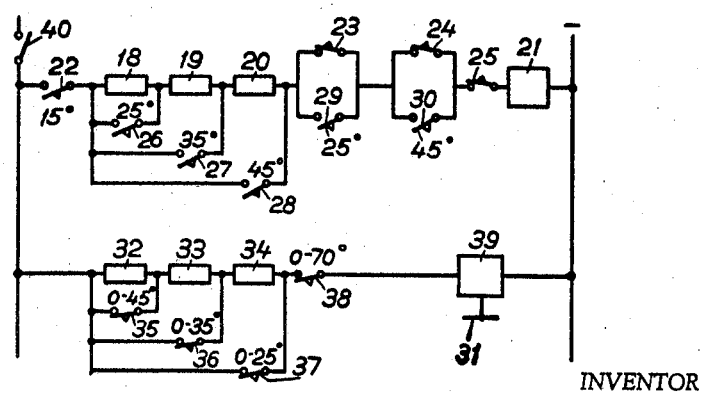
INVENTOR
ÄKE SALLOW
BY
ATTORNEY Fig. 4
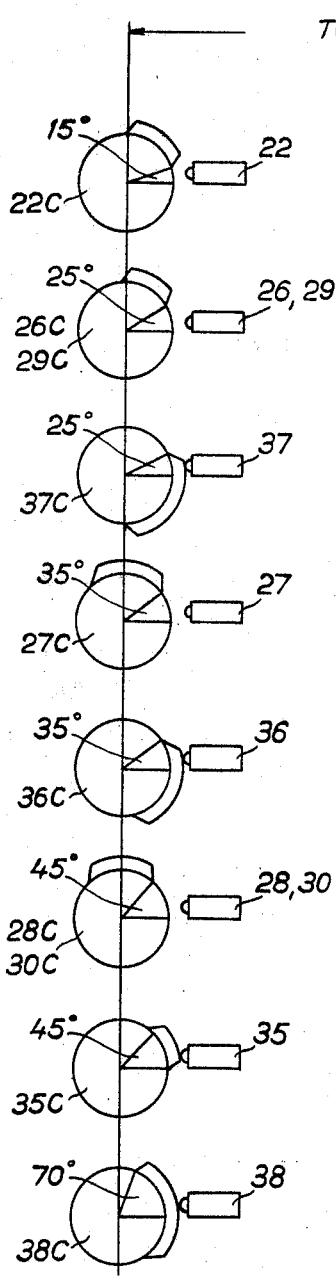
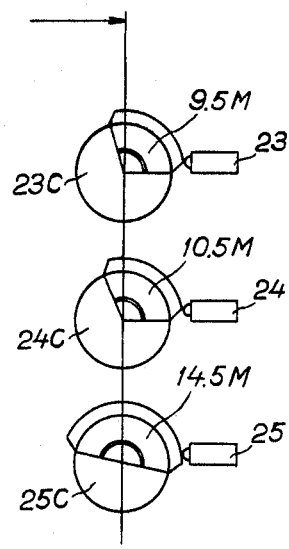

INVENTOR.
ÄKE SALLOW
BY

United States Patent Office 3,489,293
Patented Jan. 13, 1970

3,489,293
MEANS FOR CONTROLLING THE LUFFING AND SWINGING OF A LOAD ARM
Ake Sallow, Vasteras, Sweden, assignor to Allmanna Svenska Elektriska Aktiebolaget, Vasteras, Sweden, a corporation of Sweden
Continuation-in-part of application Ser. No. 611,422, Jan. 24, 1967. This application Sept. 21, 1967, Ser. No. 669,450
Claims priority, application Sweden, Feb. 2, 1966, 1,297/66
Int. Cl. B66c 23/52
U.S. Cl. 212—3          6 Claims

ABSTRACT OF THE DISCLOSURE

An arrangement for controlling the luffing and swinging of the arm of a hoisting device includes sets of cam-controlled switches connected to respond to the luffing and swinging movements respectively for varying the speeds of the motors producing these movements so as to cause the load to follow a predetermined path from one position to another; each set of cam-controlled devices affects both the luffing and the swinging speeds.

PRIOR APPLICATIONS

The application is a continuation-in-part application of Ser. No. 611,422, filed Jan. 24, 1967, now abandoned.

BACKGROUND OF THE INVENTION

Field of the invention

The present invention relates to a hoisting device with means for luffing and means for swinging a load arm with a load.

The prior art

When moving loads, for example to and from the hold in a ship, cranes are often used, for example placed one on each side of the cargo hatch. The cranes are operated by means of control members having, for example, rods movable in forward and sideward directions. When the load is moved from the hold it is first hoisted to above the level of the deck, after which the operator stops the hoisting movement and instead starts to swing the crane in the desired direction and, while swinging is continued, the crane arm is moved outwards ("luffed out") until the lowering position over the quay has been reached. Other types of cranes are operated in a similar manner and all have difficulty in combining swinging and luffing so that the load does not sway. Another difficulty is to avoid moving the load unnecessarily far or colliding with another object and also to coordinate the motor speeds most advantageously.

For harbour cranes a certain type of programme device has been constructed where the direction of the load is set by a coordinator having correctly angled coordinates for the direction of movement. The coordinate values, that is, the signals to the swinging and luffing motors are modified during movement of the load by cam discs driven by the luffing action. Such an arrangement requires stationary location of the crane and does not permit any degree of flexibility which is necessary, for example, for ships cranes.

SUMMARY OF THE INVENTION

The invention provides a solution of this and other similar problems and relates to a hoisting device comprising at least one programme device for controlling the path of the load between two hoisted positions above the initial and final positions of the load. The invention is characterized in that the programme device is controlled by the swinging and luffing movements between two selectable positions, said programme device intermittently or continuously changing the speeds of a swinging motor and a luffing motor, possibly after a time delay, at adjustable swinging and luffing angles for the arm in order to give said load a predetermined path.

The invention means that there is less risk of swaying of the load and also provides an automatic adjustment to minimum alterations in speed necessary for cross-ship movement (load movement) with optional speed and movement path. The programme device can easily be changed between different load paths and for loading different quadrants (working areas) in relation to the crane for different suitable hoisting positions on the quay.

BRIEF DESCRIPTION OF THE DRAWINGS

The invention is illustrated in the accompanying drawings where FIGURE 1 shows two cranes by a cargo hatch, FIGURE 3 shows an example of a control means according to the invention and FIGURE 2 shows the different angles for this means. FIGURE 4 shows the cam arrangement corresponding to FIGURE 3. FIGURE 5 shows the programmes for two paths of movement and FIGURE 6 shows a cam disc programme device for the paths of FIGURE 5, while

DESCRIPTION OF THE PREFERRED EMBODIMENTS

Figure 5:
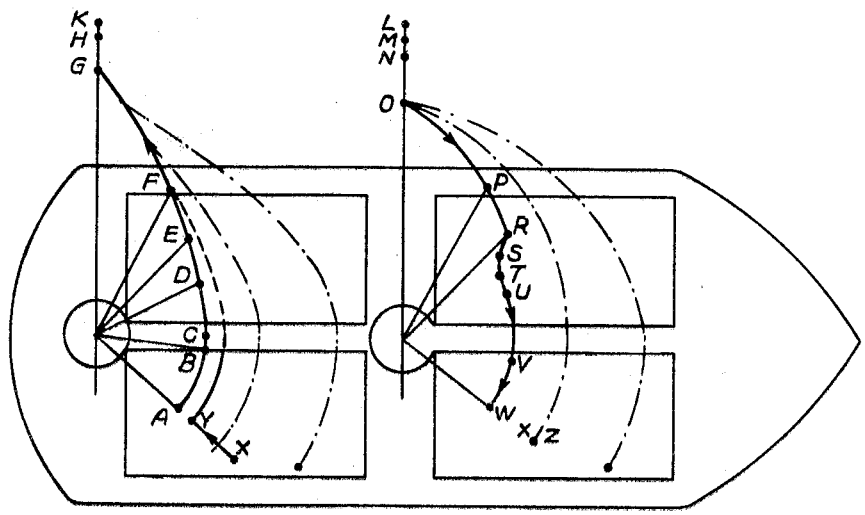

FIGURE 1 shows two cranes by a cargo hatch 11. The number of cranes and their position may be varied in many ways. Each crane has a hoisting arm 12 and 13, respectively, the programmes being arranged in the example so that in the inner positions the movements of the cranes are not impeded. In this case they are positioned so that in the inner position they face each other and do not reach over the central part of the cargo hatch, but this is not an absolute condition. It is possible to allow the top of one crane to pass over the center and adjust movement of the other crane accordingly. The crane is provided with three motors, one for hoisting (15), one for swinging (16) and one for luffing (17). The motors with adjustable speeds, for example DC motors, are fed in Ward-Leonard connection. However, even speed controlled AC motors or thyristor-fed DC motors having speed control devices or other known driving means such a hydraulic motors may be used.

The load is hoisted from the hold to a plane above the deck, this movement being carried out by the operator with the help of a control arm (not shown) movable in backward and forward directions. If the load is to be moved to a position over the quay, it is necessary to swing the crane and to luff out at the same time, a combination of two motor functions 16, 17 (a combination of rod movement forward/backward and to the side). It may be difficult for the operator to combine these movements properly without the risk of collisions or of the load swaying. There is also a risk of moving the load too far, resulting in an uneconomic load path, swinging or other hazards. By means of the invention the operator can, after choosing the swinging direction when the load is hoisted, connect an automatic programme device for optimal load movement, that is optimal speed control of swinging and luffing.

The connection may also be made automatically depending on the hoisting position. By means of this device (see also FIGURES 3 and 4) the movement is controlled from hoisted position ($A_1$, $A_2$, $A_3$ or $A_4$) to a suitably determined lowering position B over the quay along a substantially straight line or in a suitable curve between two adjustable end positions. In the first part of the movement, after controlled acceleration the swinging motor is given, for example maximum speed, while the luffing motor 17 is driven during this stage with reduced speed, or is stationary during the first swinging. In the final stage of the movement, the situation is reversed and luffing is carried out with maximum speed and swinging with reduced speed. Acceleration and retardation may be suitably time-controlled or position controlled. Thus, when the hoisting arm is out to the least extent, the swinging speed can be greatest, while, when the hoisting arm is furthest out, the luffing speed can be greatest and the swinging speed least. For example, it is desirable to follow as nearly as possible the straight line sketched in FIGURE 1 by successive alternations of the motor speeds, but it is usually suitable for economic reasons to choose a number of steps for these speed changes, which according to the example take place as intermittent field alterations in Ward-Leonard generators or other intermittent control, in which case a certain digression from the straight line cannot be avoided. The closeness to a straight line will of course depend on the number of connection points, as will be seen in the following. The control may of course also be obtained by other means of controlling the motors.

The programme device is driven both by the swinging and luffing movements. Connection and disconnection of the limit breakers may be done mechanically from a shaft in the swinging center of the crane, or the movement can be transmitted in some other manner, for instance through torque transmitters. The connection and disconnection at different swinging positions is done through the limit breaker which is controlled as indicated above and connected according to FIGURE 3, for example. FIGURE 3 shows an example of this arrangement. For speed control of the luffing motor a circuit is connected having a limit position breaker 22 which closes at a certain small swinging angle, for instance 15°. Three resistors 18, 19 and 20 are connected in series with this limit breaker, and in series with these resistors two circuits, each having two parallel-connected limit breakers. One circuit contains a breaker 23 which is opened if the crane luffs out too far, for example 9.5 m., and, parallel to this, another limit breaker 29 is connected which closes at a certain somewhat larger swinging angle, for example 25°. In series with this circuit is the second circuit containing two more parallel-connected limit breakers 24 and 30, one, 24, breaking at a certain greater luffing out, for example 10.5 m., and the other, 30, closing at a certain greater swinging angle, for example 45°. The breakers 23 and 24 and 29 and 30, respectively are safety breakers against excessive luffing and may be complemented with other breakers for other angles and luffing distances. In series with these circuits a further limit breaker 25 is arranged to break for a certain maximum luffing, for example 14.5 m. The resistor 18 is short circuited by a circuit having a limit breaker 26 which closes at a certain swinging angle for the arm in horizontal direction, for example 25°, and the resistors 18 and 19 are short-circuited by a circuit having a limit breaker 27 which closes at a certain swinging angle, for example 35°. The resistances 18, 19 and 20 are short-circuited by a circuit having a breaker 28 which closes at a certain even larger swinging angle, for example 45°. This circuit is series-connected with, for example, the field of a Ward-Leonard generator 21 feeding the luffing motor, or with some other control means for the motor speed, for example the motor field.

For the swinging motor a Ward-Leonard generator field 39, or some other control means for the motor speed, is provided with a manual control 31 for the choice of swinging direction. This can alter the motor field, or in some other way not shown in the figure, reverse the swinging direction. In series with the field 39, three resistors 32, 33 and 34 are arranged and in series with these a limit breaker 38, which is closed within the maximum swinging interval, for example 0–70°. The resistors 32 and 33 are short-circuited by a circuit having a breaker closed within the angle 0–35°. The three resistances are short-circuited by a circuit having a limit breaker 37 closed within the interval 0–25°. This circuit thus feeds the field 39 of the Ward-Leonard generator for the swinging motor or some other means controlling the speed.

The luffing distances and swinging angles for which speed changes are desired for the swinging and luffing motors, and the initial and final positions, may be suitably chosen and even changed to different values according to the desired load path or obstacles in the load path, and a curved path of movement is often chosen.

The device functions in the following manner (see FIGURE 2). When the load has been hoisted it is, for example, in position $A_2$ (or $A_1$, $A_3$ or $A_4$). With a suitable switch, for example 40 (FIGURE 3), the operator connects the automatic control and sets the control 31 for a suitable swinging direction for automatically moving the load to point B where it is to be lowered to the quay. In position $A_2$, thus, the load substantially follows the straight line $A_2$–B and the speeds of the motors 16 and 17 (FIGURE 1) are adapted so that optimal movement path and movement speed are obtained without the above-mentioned disadvantages. In the swinging interval 0–15° the limit breaker 22 is open and the field 21 is not fed. The luffing motor is thus stationary. All the limit breakers for the swinging motor, 35, 36, 37 and 38, are closed and the swinging motor thus has its top speed, with suitably controlled acceleration. At, for example, the swinging position 15°, or another suitably chosen first step, the breaker 22 is closed. The breakers 23, 24 and 25 may be assumed closed since in this case the luffing does not exceed, for instance 9.5 m. The luffing motor now attains a first, relatively low speed, since the breakers 26, 27 and 28 are open and the current passes through all three resistances 18, 19 and 20. At, for example, the swinging angle 25°, the breaker 26 is closed as is breaker 29, and the resistor 18 is short-circuited thus causing the luffing motor speed to increase somewhat. At 25° the limit breaker 37 breaks and the current for the swinging motor generator field must pass through the resistance 34, thus decreasing the speed of the swinging motor somewhat. At the next stage, here at an angle of 35°, the breaker 27 is also closed and the current for the generator field of the luffing motor need only pass the resistor 20 and the speed thus increases further. At 35° the breaker 36 also breaks and the current for the swinging motor field must pass both the resistors 33 and 34. The feeding voltage thus decreases and the speed of the swinging motor is further lowered.

At the next stage, for example 45°, the breaker 28 is also closed, as is the breaker 30 (it is assumed that the luffing distance does not exceed 10.5 m.) so that all three resistors are short-circuited and the speed of the luffing increases to maximum. The breaker 35 opens at 45° and the current flows through all three resistors 32–34 thus decreasing the speed of the swinging motor to a relatively low value. When maximum swinging angle, here 70°, is reached, the breaker 38 breaks and the swinging motor stops. When maximum luffing distance has been reached, here 14.5 m., the limit breaker 25 also breaks and the luffing motor stops, whereupon the final position has been reached. The luffing and swinging speeds are so mutually adapted that the maximum luffing distance, 14.5 m., usually coincides with the swinging angle of 70°.

If the cooperation between swinging angle and luffing should for some reason vary, for example due to unbalanced loading of the ship, the limit breakers 23 and 24 will break at the set luffing distances, here 9.5 and 10.5 m., respectively and other releasing values will be obtained for the luffing motor. In this way it is ensured that the luffing does not exceed the maximum luffing distance for the respective swinging angle. In such extreme cases, however, a certain digression from the straight line is permitted. In this case it has been assumed that the luffing motor and swinging motor have the same control steps, but, if their speed curves are not exactly the same, and if more exact control is necessary, separate control steps can be arranged for the luffing and swinging motors respectively, for example different swinging angles for the respective motors.

The control may also be carried out continuously, for example by means of a potentiometer or other electric position indicator. Control can also be obtained with the help of cam disc means, transistorized programme device or the like. Control means can also be connected for movement in the opposite direction, for example for loading vessels, whereby the goods are moved from position B to any of the positions $A_1$–$A_4$.

FIGURE 4 shows diagramatically the two shafts LS and SS connected so as to be responsive to luffing and swinging movements respectively and carrying cams $22c$ to $30c$ and $35c$ to $38c$ for operating switches with the corresponding numbers (some cams operate two switches).

The result of using switches such as 23 and 29 in parallel is that, if the luffing movement reaches 9.5 m. before the swinging movement has reached 25°, both switches will be opened and luffing will be stopped until the swinging movement catches up to the proper point in the programme.

Figure 6:
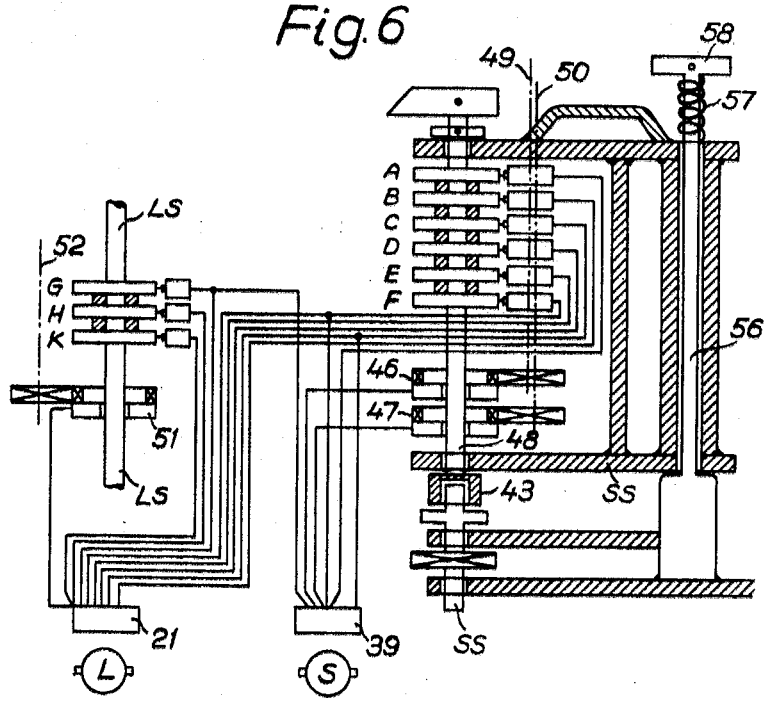
Figure 7:
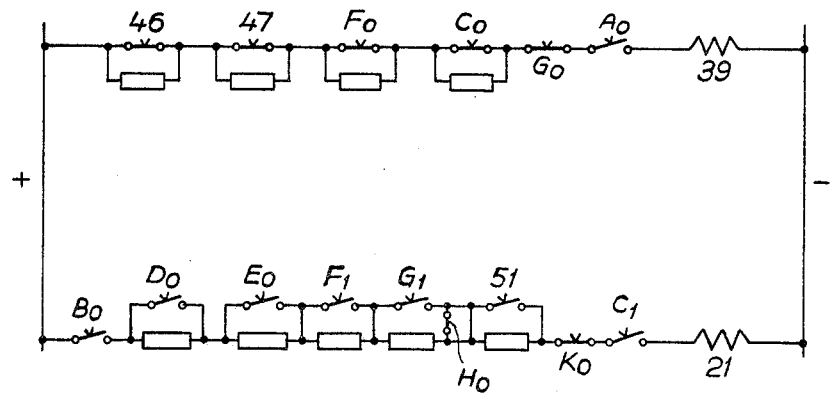
FIGURE 7 shows the circuit of FIGURE 6.
Figure 8:
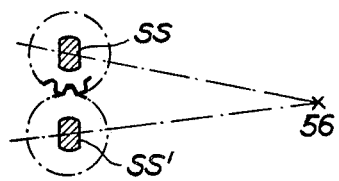
FIGURE 8 is a detail of a part of FIGURE 6.

Referring now to FIGURES 5 to 7, FIGURE 6 shows a swinging motor S and a luffing motor L with fields 39 and 21 respectively. SS and LS are shafts driven in synchronism with the swinging and luffing motors respectively. Shaft SS through a connection to be described below drives a shaft 48 which has secured on it cams A, B, C, D, E and F, each operating a switch or breaker $A_0$ to $F_0$ (see FIG. 7). Cams C, F, and G also operate switches $C_1$, $F_1$ and $G_1$ which are open when switches $C_0$, $F_0$, and $G_0$ are closed. There are mounted on the shaft SS, but frictionally engaged with it, contact discs 46 and 47, acting as switches which close circuits to the field 39 during certain intervals. These may be adjusted around the shaft axis by cooperating gears mounted on shafts indicated diagrammatically at 49, 50 respectively, which are manually operable (these shafts may turn as shaft 48 turns, but this is immaterial to the operation).

Shaft LS has cams G, H and K which operate switches $G_0$, $H_0$ and $K_0$ respectively. A contact member 51 mounted frictionally on shaft LS can be manually turned by a shaft 52.

At the beginning position, shaft 49 occupies such a position that switch $A_0$ is closed, so that field 39 is energized and swinging starts.

The swinging movement drives shaft 48 and when position B (FIGURE 5) is reached the speed control means 21 for the luffing motor (L) is connected (switch B is closed). However, this does not result in luffing since switch $C_1$ is still open. At position C the field circuit 39 for the generator of the luffing motor is closed for slow speed (switch $C_1$ is closed, see FIGURE 7) and the luffing motor L is started and the swinging motor S slowed down a little (switch $C_0$ in the field circuit 39 of FIGURE 6 is opened). At D and E the speed of the luffing motor is increased (switches $D_0$ and $E_0$, respectively, in FIGURE 7 closed) and at F the swinging motor is retarded and luffing motor accelerated (switch $F_0$ opened and $F_1$ closed, FIGURE 7). The discs G, H, K, together with their shaft 1, are driven by the luffing movement in one direction when luffing out and in the opposite direction when luffing in. At G the swinging movement is stopped (switch $G_0$ is opened) and the luffing motor is accelerated (lower switch $G_1$ is closed), to be subsequently retarded in position H (switch $H_0$ is opened) and stopped in position K (switch $K_0$ is opened).

As shown in FIGURE 6 the contact discs 46 and 47 constitute switches 46 and 47 for speed control of the swinging motor S and a similar contact 51 for speed control of the luffing motor. It is also possible to combine the action upon swinging and luffing from the discs 46 and 47 or disc 51.

The return movement need not follow the outward movement, being varied, for example, by using a different programme mechanism or by changing the settings of discs 46, 47 and 51 to change the speeds of the two motors during certain intervals by cutting in or out resistors. For example, as shown at the right of FIGURE 5, the movement in position L may be started by closing switch K, for example manually ($C_1$ is closed in this position) with changed polarity for motors L and S.

When the luffing motor starts the shaft SS is driven in the opposite direction and the positions M and N (corresponding to K and H) are reached and thereafter O (corresponding to G if the same circuit as in FIGURE 6 is used, but if the resistances and the disc angles are changed the positions L–W are somewhat different from A–K). In position O the swinging motor is started and the path as described above is followed backwards. After O the shaft LS is driven in the opposite direction.

Shaft 48 is mounted on a disc 55 which is turnably mounted on a shaft 56, being pressed downward by a spring 57. Shaft SS drives by gearing a parallel shaft $SS^1$. Shaft 56 is equidistant from shafts SS and $SS^1$. Shafts SS and $SS^1$ have square heads which can fit into a square socket carried by the shaft 48, constituting the joint 43. By lifting up plate 55, and turning it to a position to engage shaft 48 with shaft $SS^1$, the direction of movement of shaft 48 can be reversed. Likewise, by raising the plate and turning knob 58, the shaft 48 can be set to a different angular position, either for operation of the crane in a different quadrant or for bringing into play a different set of cam surfaces to employ a different programme.

Control of the electric swinging and luffing motors is carried out by means of cam discs and electric contacts, but may also be done by means of hydraulic valves or the like. The motors S and L may also be hydraulic.

The programme device for luffing is controlled by the luffing movement and, as can be seen, this programme device in certain positions influences the swinging motor S, just as the programme device for the swinging in certain positions influences the luffing motor L.

It is also possible to have certain rapid setting positions in these programme devices for both luffing and swinging, so that it is possible to rapidly adjust to other desired end positions and/or movement paths for the load. FIGURE 5 shows two such setting devices (the number may be chosen arbitrarily). If the resistors in parallel with them are omitted, discs 46, 47 by means of turning rods 49, 50 can be used to stop the movement at suitable end or intermediate positions. For example the crane can be driven to a certain desired end position without using the programme device, after which the rods 49, 50 are turned to the same position (which may be indicated by means of lamps or the like), thus setting a programmed end position. In this case the newly set path is followed when the programme device is connected. The programme device can be similarly adjusted by contact disc 51 and its rod 52. It is possible to programme several alternative load paths by means of several connection members placed parallel or in series with the same or another cam or contact disc. The choice of the load path may be made by a simple connection device at the operating place as shown by the dotted lines which show alternative load paths which can be connected in by means of switches.

If the operating radius is exceeded, for example to position X, luffing can be started at this position by means of cam discs, not shown, to position Y where the luffing motor is stopped and swinging to the left starts. The dotted line is then followed during continued driving to the left. Programme driving may then be continued to position Z which has been set as described above.

When swinging in from position L for the first crane (FIGURE 5), luffing is started in a corresponding manner at position L and the luffing movement is accelerated in positions M and N, for example by time or cam control. At position O the swinging is started by the programme device and thus the movement is controlled by both the shafts LS and SS to the position R where it is stopped and possibly reversed, or continues, for example to position W through the positions U and V.

By arranging separate control for manual and automatic driving, the movement can be started and stopped at any chosen position along the whole path. Similarly, by introducing manual driving, the movement can be changed at any position along the way.

I claim:

1. In combination with a load handling device having means for luffing and means for swinging a load, a programme device for controlling the path of the load between two different positions comprising means responsive to the luffing movement to control the luffing and swinging means and means responsive to the swinging movement to control both the luffing and the swinging means, said means responsive to the swinging movement including a first shaft operatively connected to the swinging means to move synchronously therewith, a member having a cam-carrying shaft turnably mounted therein parallel to the first shaft, coupling members on the ends of said shafts, and means mounting said member for movement to permit engagement and disengagement of the coupling members.

2. In a combination as claimed in claim 1, a third shaft parallel to the first shaft, means connecting the third shaft to the first shaft to turn in the opposite direction thereto, and means mounting the member to turn about an axis equidistant from the first and third shafts, whereby the cam-carrying shaft can be brought into coupling relation with either of the first and third shafts.

3. In combination with a load handling device having motor means for swinging and motor means for luffing a load carrying member, at least one programme device for controlling the motor means to produce movement of the load carrying member between desired initial and final positions of the load carrying member respectively, said programme device including means responsive to the variations in the swinging of the load carrying member to vary the speeds of both said motors to cause a load to travel in a predetermined path between said positions, said means responsive to the swinging movement including a first shaft operatively connected to the swinging means to move synchronously therewith, adjustable control means mounted upon said shaft and second control means mounted parallel with said shaft for cooperation with said first control means at different turning angles of the shaft.

4. In a combination as claimed in claim 3, said first and second control means being turnable and adjustable cam discs and cooperating electric contacts.

5. In combination with a load handling device having motor means for swinging and motor means for luffing a load carrying member, at least one programme device for controlling the motor means to produce movement of the load carrying member between desired initial and final positions of the load carrying member respectively, said programme device including means responsive to the variations in the swinging and luffing of the load carrying member to vary the speeds of both said motors to cause a load to travel in a predetermined path between said positions.

6. In a device as claimed in claim 5, said motor speed varying means comprising cam disc means and cooperating switch means, one of said last means being operatively connected to said load carrying member.

References Cited

UNITED STATES PATENTS

| 2,916,162 | 12/1959 | Gercke | 212—39 |
| 2,941,132 | 6/1960 | Pell | 318—77 |
| 3,035,712 | 5/1962 | Nowack | 212—39 |

FOREIGN PATENTS

| 1,065,152 | 9/1959 | Germany. |
| 1,169,631 | 5/1964 | Germany. |

HARVEY C. HORNSBY, Primary Examiner

U.S. Cl. X.R.

212—39, 59, 144; 318—77; 340—282